Patented Nov. 7, 1922.

1,434,465

UNITED STATES PATENT OFFICE.

WILLIAM R. WEBB, OF ROCHESTER, NEW YORK, ASSIGNOR TO EASTMAN KODAK COMPANY, OF ROCHESTER, NEW YORK, A CORPORATION OF NEW YORK.

CELLULOSE-ETHER SOLVENT AND COMPOSITION.

No Drawing. Application filed February 23, 1922. Serial No. 538,644.

*To all whom it may concern:*

Be it known that I, WILLIAM R. WEBB, a citizen of the United States of America, residing at Rochester, in the county of Monroe and State of New York, have invented certain new and useful Improvements in Cellulose-Ether Solvents and Compositions, of which the following is a full, clear, and exact specification.

This invention relates to solvents for making strong solutions of cellulose ether and also relates to the cellulose ether compositions produced by the aid of such solvents. One object of my invention is to provide a solvent which will dissolve such large proportions of cellulose ethers that thick or viscous flowable solutions may be obtained for use in plastic and film making arts. Another object of my invention is to provide a cellulose either solution which may be manufactured into strong, flexible, transparent film on the machines and by the methods now in use.

In U. S. Patent No. 1,188,376, Lilienfeld, June 20, 1916, there are disclosed a series of alkyl ethers of cellulose. Certain of these are practically insoluble in water, and my invention relates but is not limited to the ethers having that property. While the ethers form thin solutions in carbon tetrachlorid or in the acetic esters of the lower monohydroxy aliphatic alcohols, it has been found that such single solvents by themselves will not dissolve a sufficient proportion of the ethers to make a desirably thick, flowable composition or dope, such as may be used for instance in the manufacture of photographic film base by the customary methods.

I have discovered that an adequately strong and useful solvent may be prepared by mixing these substances, and that they will produce dopes of the desired qualities. As one example of my invention, I may mix 75 parts of carbon tetrachlorid with 25 parts of ethyl acetate or methyl acetate, or a mixture of them. The acetic esters of propyl, isopropyl, butyl, isobutyl, amyl, and isoamyl alcohols have a similar action but in less degree.

The cellulose ether, such as water-insoluble ethyl cellulose, is dissolved in the above mixture. The most useful proportions are 1 part of cellulose ether by weight to 5 parts of the solvent. For film manufacture, we prefer to employ 1 part of the ether to from 4 to 6 parts by weight of the solvent. From 4 to 6 parts by weight of the separate solvent constituents alone, will not dissolve 1 part of this ether to produce a flowable dope useful in film manufacture. Other substances which impart suppleness, or incombustibility, or other qualities to the film may be added to the dope, such, for instance as triphenyl phosphate, tricresyl phosphate, camphor, monochlornaphthalene, etc.

The ingredients are of the ordinary commercial type and sufficiently purified for the process of film manufacture, so as to give a dope yielding films having the proper relative freedom from color. The viscous-flowable dope above described can be used in connection with the usual film-forming apparatus without the necessity of expensive alterations in the latter.

Having thus described my invention, what I claim as new and desire to secure by Letters Patent is:

1. A mixed solvent for cellulose ether, comprising carbon tetrachlorid and the acetic ester of a monohydroxy aliphatic alcohol of less than 6 carbon atoms.

2. A mixed solvent for cellulose ether, comprising carbon tetrachlorid and ethyl acetate.

3. A mixed solvent for cellulose ether, comprising approximately 75 parts by weight of carbon techrachlorid and 25 parts by weight of ethyl acetate.

4. A flowable film-forming composition, comprising cellulose ether dissolved in a mixture of carbon tetrachlorid and an acetic ester of a monohydroxy aliphatic alcohol of less than 6 carbon atoms.

5. A flowable film-forming composition, comprising an alkyl ether of cellulose dissolved in a mixture of carbon tetrachlorid and ethyl acetate.

6. A flowable film-forming composition, comprising water-insoluble ethyl cellulose dissolved in a mixture containing approximately 75 parts by weight of carbon tetrachlorid and 25 parts by weight of ethyl acetate.

Signed this 27th day of January 1922.

WILLIAM R. WEBB.